(12) United States Patent
Kushwaha

(10) Patent No.: US 8,799,907 B2
(45) Date of Patent: *Aug. 5, 2014

(54) TASK MANAGEMENT SYSTEM

(75) Inventor: Abhitabh Kushwaha, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/454,160

(22) Filed: Apr. 24, 2012

(65) Prior Publication Data

US 2012/0209647 A1 Aug. 16, 2012

Related U.S. Application Data

(63) Continuation of application No. 12/241,899, filed on Sep. 30, 2008, now Pat. No. 8,185,897.

(51) Int. Cl.
*G06F 9/46* (2006.01)

(52) U.S. Cl.
USPC .................................................. 718/100

(58) Field of Classification Search
None
See application file for complete search history.

(56) References Cited

U.S. PATENT DOCUMENTS

| 7,551,917 B1 * | 6/2009 | Winner et al. ............. 455/414.1 |
| 8,195,528 B1 * | 6/2012 | McLellan et al. .......... 705/26.81 |
| 2001/0039594 A1 | 11/2001 | Park et al. |
| 2002/0023158 A1 | 2/2002 | Polizzi et al. |
| 2005/0015292 A1 * | 1/2005 | Wilson et al. ...................... 705/9 |
| 2008/0065467 A1 | 3/2008 | Nyegaard |
| 2008/0147470 A1 | 6/2008 | Johri et al. |

* cited by examiner

*Primary Examiner* — Emerson Puente
*Assistant Examiner* — Sisley Kim

(57) ABSTRACT

A device may receive, over a network, a message that describes a task, create a new task object based on the message, determine whether the task includes performing a follow up task or a new task based on the message, discard the new task object when the task is neither a follow up task nor a new task, perform a follow up to verify a performance of another task when the task is a follow up task, and assign the task to one of multiple queues for processing when the task is a new task.

20 Claims, 13 Drawing Sheets

TASK MANAGEMENT SYSTEM

CROSS-REFERENCE TO RELATED APPLICATION

This application claims priority to and is a continuation of U.S. patent application Ser. No. 12/241,899 filed Sep. 30, 2008, the entirety of which is hereby incorporated by reference herein.

BACKGROUND INFORMATION

Today's entry order system eliminates manual order processing, identifies pre-qualified accounts for receiving credits for a purchase, provides a product catalog, quotes product prices based on pricing rules, and/or performs other processes that are related to order provisioning. In some instances, however, the entry order system may generate a fallout problem or manual work that requires manual intervention to complete the order provisioning, such as manual test and turn-up of a customer order.

DETAILED DESCRIPTION OF PREFERRED EMBODIMENTS

The following detailed description refers to the accompanying drawings. The same reference numbers in different drawings may identify the same or similar elements.

In the following, a task management system may receive a communication message that requests the task management system to process a fallout task or a manual task that results from a provisioning system (e.g., an automated order entry system). The task management system may either perform the task automatically or allow a user to perform the task. In addition, the task management system may allow one or more users to assume different types of roles (e.g., a supervisor, an administrator, or a user) to administer (e.g., abort, lock, verify, provide a comment, etc.) the task.

Figure 1:
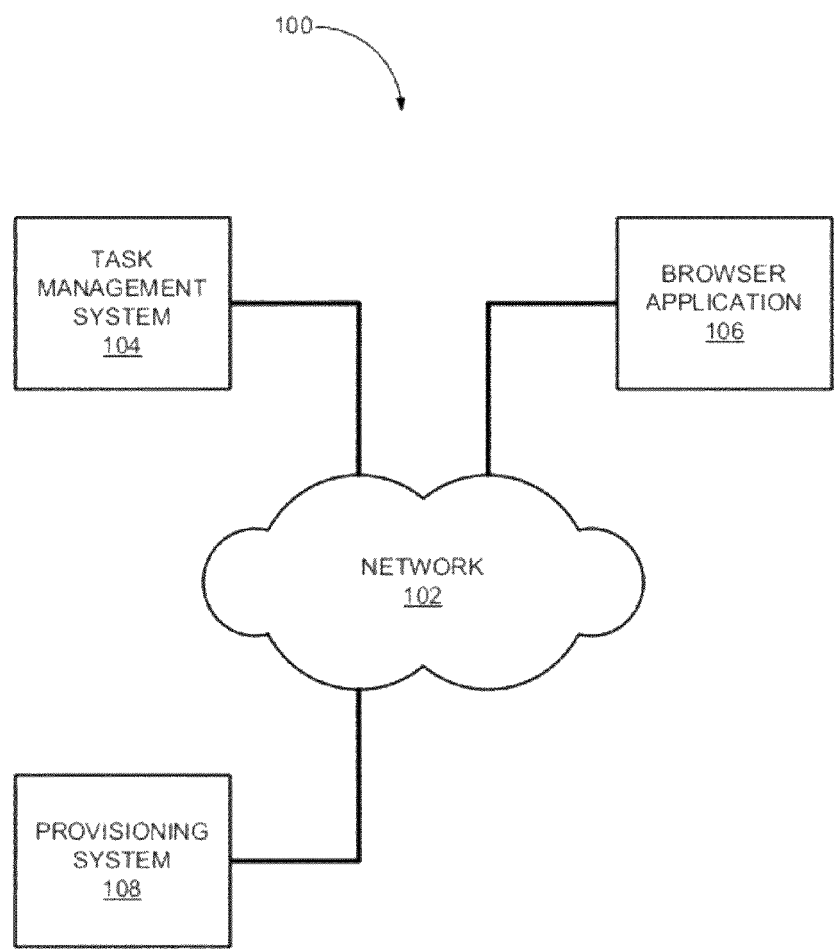
FIG. 1 shows an exemplary network in which concepts described herein may be implemented.

FIG. 1 shows an exemplary network 100 in which concepts described herein may be implemented. As shown, network 100 may include a network 102, a task management system 104, a browser application 106, and provisioning system 108. Depending on the implementation, network 100 may include additional, fewer, different, or differently arranged components than those illustrated in FIG. 1.

Network 102 may include the Internet, an intranet, a local area network (LAN), a wireless LAN (WLAN), a wide area network (WAN), a metropolitan area network (MAN), a cellular network, a public switched telephone network (PSTN), any other network, or a combination of networks.

Task management system 104 may receive messages from provisioning system 108, generate tasks based on the messages, and perform the tasks. In receiving the messages and/or performing the tasks, task management system 104 may interact with browser application 106 and/or provisioning system 108 over network 102.

Browser application 106 may include components for interacting with provisioning system 108 and/or task management system 104. For example, a user may use browser application 106 to administer tasks at task management system 104 or to order a product or a service from provisioning system 108.

Provisioning system 108 may include components for provisioning services and/or product order entries. In addition, provisioning system 108 may send a message that either describes a manual task or a fallout condition to task management system 104 when provisioning system 108 encounters an issue that cannot be resolved at provisioning system 108.

Figure 2:
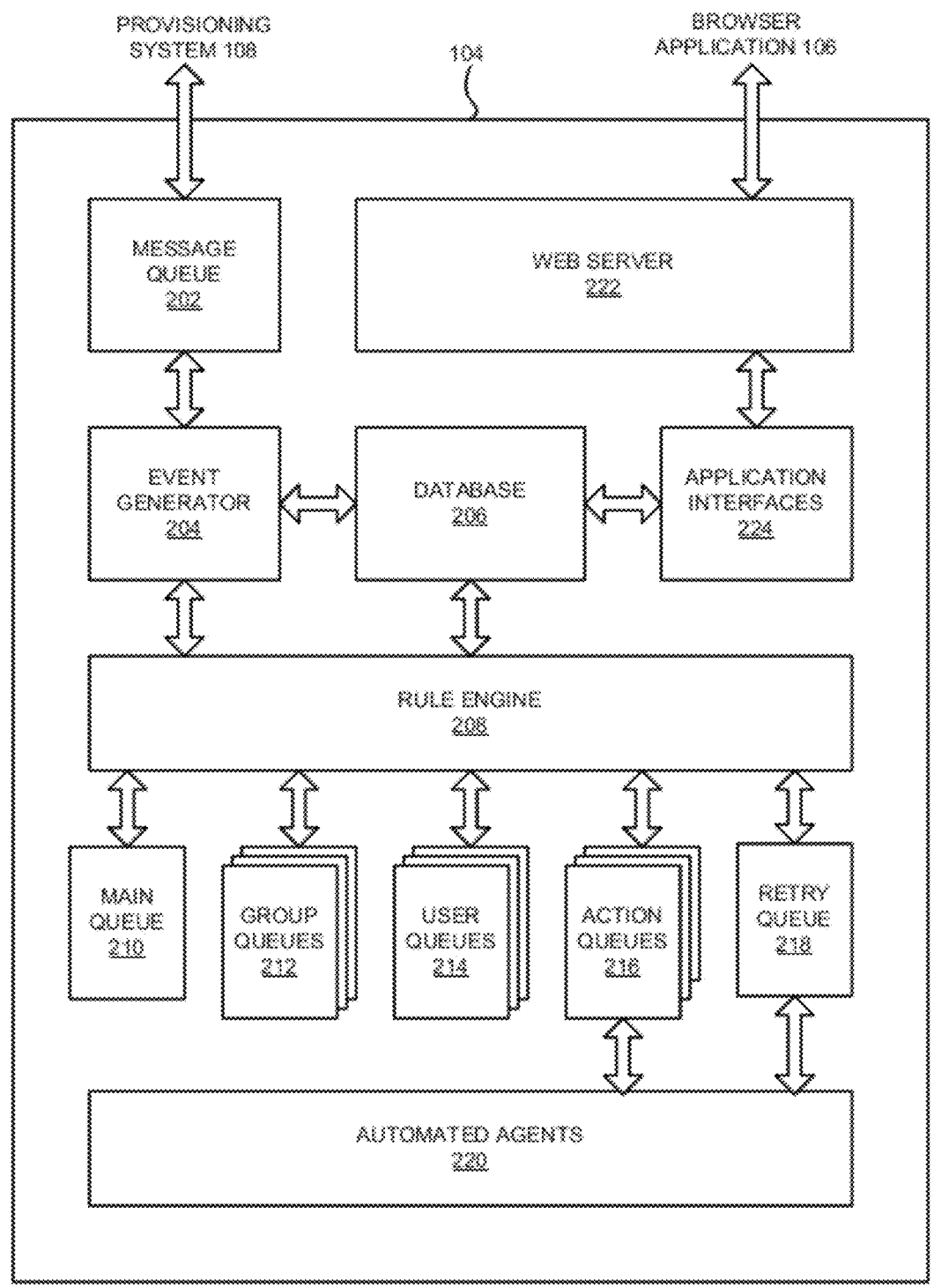
FIG. 2 is a functional block diagram of a task management system of FIG. 1.

FIG. 2 is a functional block diagram of task management system 104. As shown, task management system 104 may include a message queue 202, an event generator 204, a database 206, a rule engine 208, a main queue 210, group queues 212 (herein individually referred to as group queue 212), user queues 214 (herein individually referred to as user queue 214), action queues 216 (herein individually referred to as action queue 216), a retry queue 218, automated agents 220 (herein individually referred to as automated agent 220), a web server 222, and application interfaces 224 (herein individually referred to as application interface 224). Depending on the implementation, task management system 104 may include additional, fewer, different, or differently arranged components than those illustrated in FIG. 2.

Message queue 202 may include a component for receiving a message from provisioning system 108 and buffering the received message until the message is sent to or removed by event generator 204. Event generator 204 may include a component for accessing or removing a message from message queue 202 and generating a task based on contents of the message. In generating the task, event generator 204 may update database 206 with information included in the message.

Database 206 may include information that pertains to a task created at event generator 204. In addition, database 206 may include routing rules that rule engine 208 may apply to the task. For example, database 206 may include a routing rule that states:

a. TASK_CODE="<CODE>" and ORDER_TYPE="ADD", ASSIGN TO MAIN QUEUE.

The preceding routing rule may specify that, if TASK_CODE associated with the task is equal to a particular code and ORDER_TYPE of the task is "ADD," rule engine 208 is to assign the task to main queue 210. A user may add, edit, and/or remove different routing rules in database 206 via browser application 106.

Rule engine 208 may include a component for applying one or more routing rules in database 206 to a task. By applying a routing rule to a task, rule engine 208 may transfer the task from a queue (e.g., one of queues 210, 212, 214, 216, and 218) to another queue.

Main queue 210 may include a queue for storing a task created at event generator 204 until rule engine 208 transfers the task to a different queue (e.g., one of group queues 212, user queues 214, action queues 216, or retry queue 218). Group queue 212 may include a queue for storing a task for a group of users, until the task is assigned to a user in the group. When the task in group queue 212 is assigned to a specific user, the task may be transferred from group queue 212 to a queue associated with the user (e.g., user queue 214). In this case, the queue may become a user queue 214 for that particular user. User queue 214 may include a queue for storing a task assigned to a particular user or a group to which the particular user belongs. The task may be removed from user queue 214 when the task is reassigned to a different user or a different group, or when the task is completed.

Action queue 216 may include a queue for storing a task until automated agent 220 performs an action associated with the task. If automated agent 220 is unable to perform the action, rule engine 208 may transfer the task to retry queue 218. Retry queue 218 may include a queue for holding a task for a prescribed time. After the time elapses, rule engine 208 may return the task to action queue 216. The task may bounce back and forth between action queue 216 and retry queue 218 until either automated agents 220 fail to perform the action for a particular number of times, the task is completed, or the task is assigned to group queue 212 or user queue 214.

Automated agents 220 may include components for performing actions that are associated with a task in action queue 216. If automated agents 220 are unable to perform the actions, the task may be placed in retry queue 218.

Web server 222 may include a component for interacting with browser application 106 and/or components of task management system 104. For example, when a browser application 106 requests task management system 104 to transfer a task from main queue 210 to group queue 212, web server 222 may receive the request, and invoke one or more of application interfaces 224.

Application interface 224 may include a component for performing an action that web server 222 requests. In the previous example, application interface 224 may transfer the task from main queue 210 to group queue 212. In performing the action, application interface 224 may or may not access database 206.

Figure 3:
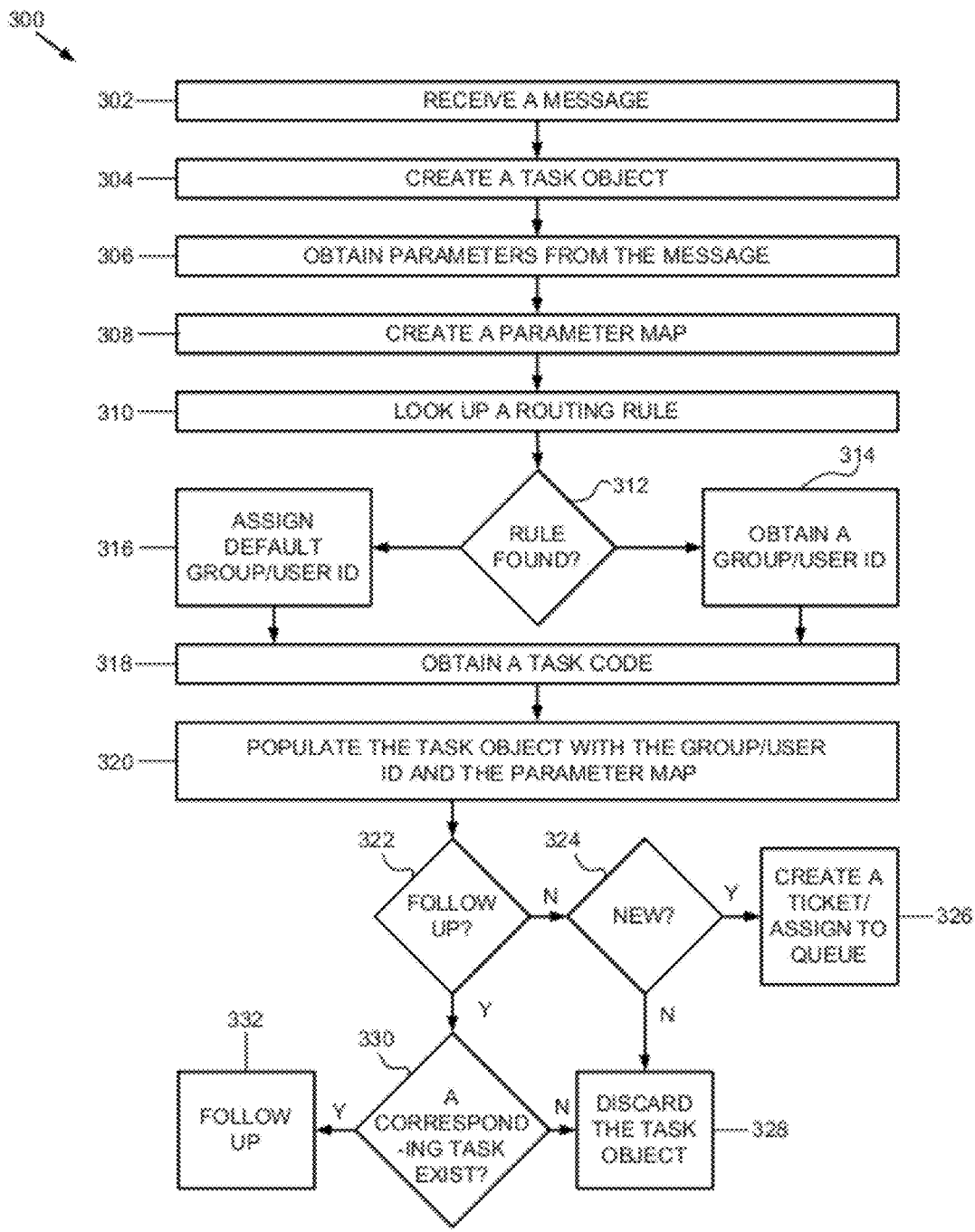
FIG. 3 is a flow diagram of an exemplary process for creating a task.
Figure 4:
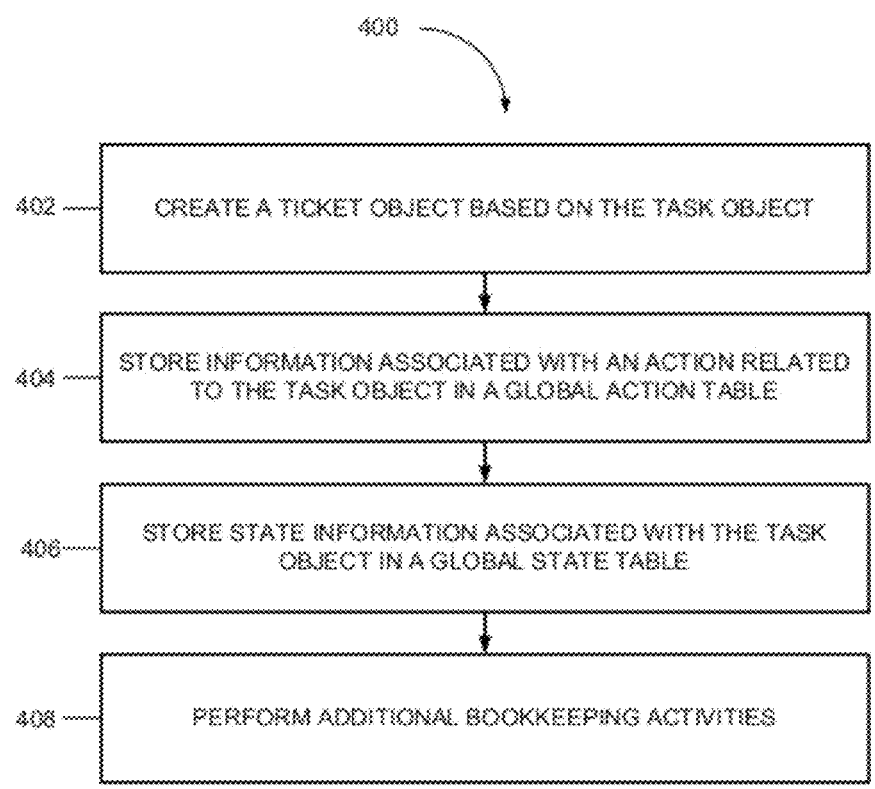
FIG. 4 is a flow diagram of an exemplary process for creating a ticket.
Figure 5:
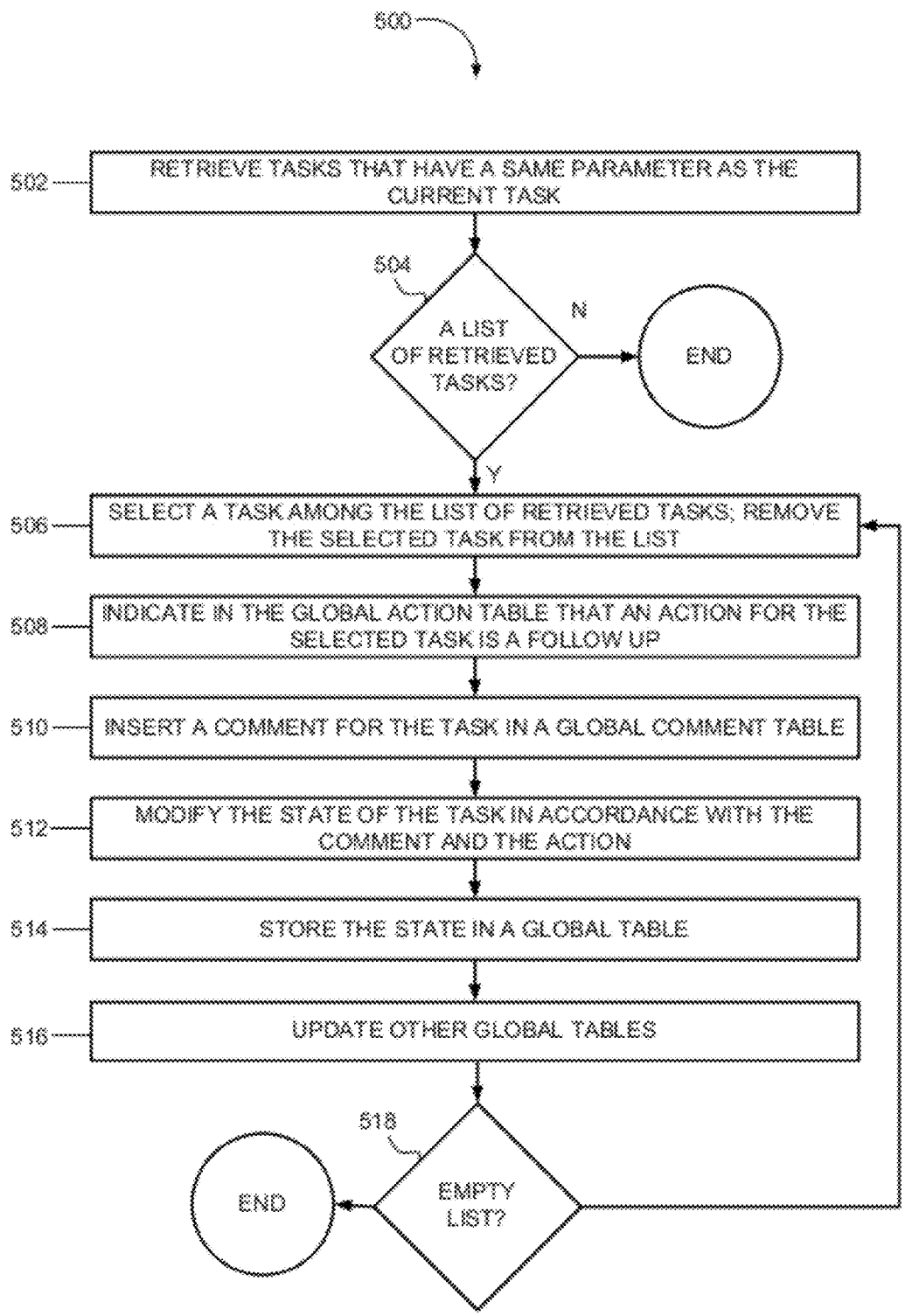
FIG. 5 is a flow diagram of an exemplary process for performing a follow up.

FIGS. 3-5 show different processes that task management system 104 may perform. Although FIGS. 3-5 illustrate only few a processes for purposes of simplicity, task management system 104 may perform processes other than those illustrated in FIGS. 3-5.

FIG. 3 is a flow diagram of an exemplary process 300 for creating a task. Process 300 may begin when a message is received (block 202). For example, task management system 104 may receive a message from provisioning system 108. The message may describe either a fallout condition (e.g., an issue that cannot be resolved at provisioning system 108) and/or a task that requires manual work steps. Depending on the implementation, the message may include a eXtensible Markup Language (XML) document and/or object, a Hypertext Markup Language (HTML) document and/or object, a remote procedure call (RPC), a remote method invocation (RMI), etc. When the message arrives at task management system 104, task management system 104 may place the message in message queue 202.

A task object may be created (block 304). Depending on context, the term "task object," as used herein, may refer to one or more blocks of memory that may be allocated for a particular task. The task object may store information related to the task when components (herein referred to as "members") of the task are filled or written to with the information. Depending on the context, the term "task" may refer to a task object. Task management system 104 may place the task in main queue 210.

Parameters may be obtained from the message (block 306). For example, if an XML message includes an order number, the order number may be obtained from the XML message. In obtaining a parameter, task management system 104 may parse the XML message to detect a name of the parameter and a value associated with the parameter.

A parameter map may be created (block 308). As used herein, the term "parameter map" may refer to either a collection (e.g., a set) of parameters, or objects for storing the parameters. In one implementation, to create the parameter map, a name of each parameter may be used to retrieve, from database 206, a parameter identifier that is associated with the name.

Furthermore, the identifier and a value associated with the parameter may be used to create a parameter identifier-value pair object, which may be placed in the parameter map. Once the parameter map is populated with parameter identifier-value pair objects, task management system 104 may use a parameter identifier to look-up a value associated with the parameter identifier in the parameter map.

A routing rule may be looked up (block 310). In one implementation, task management system 104 may look up a routing rule in database 206, based on one or more of the parameter identifiers. The routing rule may indicate to which group (or group queue 212) or which user (or user queue 214) the task may be routed. The group may be identified by a group identifier. The user may be identified by a user identifier.

If a routing rule is found (block 312—YES), a group or user identifier may be obtained based on the routing rule (block 314). If the routing rule is not found (block 312—NO), a default group or user identifier may be assigned to the task (block 316).

A task code may be obtained (block 318). In some implementations, the message (see block 302) may provide a code associated with a task. In such implementations, task management system 104 may obtain a task code from the message. If the message does not provide a task code, task management system 104 may create a new task code. Task management system 104 may write the task code into a member of the task object.

The task object may be populated with the group or user identifier and the parameter map (block 320). For example, task management system 104 may insert the group or user identifier and the parameter map into the task object.

If the task is not a follow up task (block 322—NO), it may be determined whether the task is a new task (block 324). As used herein, the term "follow up task" may include a task that verifies a performance of one or more preceding tasks. Whether the task is a follow up task or a new task may be indicated in the message. If the task is new (block 324—YES), task management system 104 may create a ticket for tracking the task (block 326). Task management system 104 may also, or alternatively, assign the task to a queue for processing (block 326). For example, task management system 104 may transfer the task from main queue 210 to a group queue (based on the group identifier) or a user queue 214 (based on the user identifier) to await processing. If the task is not new (block 324—NO), task management system 104 may discard the task object (block 328).

Returning to block 322, if task management system 104 determines that the task is a follow up task (block 322—YES), it may be determined if a corresponding task (e.g., a task to be followed up) exists (block 330). To determine whether the corresponding task exists, task management system 104 may look up the corresponding task in database 206 based on one of the parameter identifier-value pairs created at block 308. If database 206 does not include the corresponding task, task management system 104 may determine that the corresponding task does not exist (block 330—NO), and discard the task object (block 328). If database 206 includes the corresponding task, task management system 104 may determine that the corresponding task exists (block 330—YES) and perform a follow up (block 332). A description of follow up is provided below.

FIG. 4 is a flow diagram of an exemplary process 400 for performing block 326 (FIG. 3), to create a ticket. As shown, process 400 may begin by creating a ticket object based on the task object (block 402). In some implementations, task management system 104 may store information related to the ticket object (e.g., parameter identifier-value pairs obtained from the task object, a description of the task, etc.) in database 206.

Information related to an action associated with the task object may be stored in a global action table (block 404). A task may be associated with one or more actions. For example, the task object in block 402 may be associated with its creation. In such a case, an identifier for the action of creating the task object may be stored in a global table, herein referred to as "global action table." The global action table may be implemented in a memory and/or database 206.

State information associated with the task object may be stored in a global state table (block 406). A task object may be in one of several states. For example, a task object may be in a pending state (e.g., a state in which one or more actions for completing the task are pending), an aborted state (e.g., a state in which actions for completing the task have been aborted), a completed state (e.g., a state in which actions for completing the task have been performed), etc. The state of the task object may be stored in a memory and/or in database 206.

Additional bookkeeping activities may be performed (block 408). For example, task management system 104 may insert a comment, which is provided by a user or a component in task management system 104 and associated with the task object, in a global comment table. In one implementation, a comment may include a string of characters. A comment may be user-created or system-created. A user-created comment may include a note, such as an auditing-related note. A system-created comment may record an action taken by a user on a task and may record the date and time at which the action took place.

FIG. 5 is a flow diagram of an exemplary process 500 for performing block 332 (FIG. 3), to follow up a task. In process 500, the current task may include a follow up task, which may be associated with one or more tasks to be followed up.

As shown, process 500 may start at block 502, where tasks that have the same parameter as the current task may be retrieved (block 502). For example, task management system 104 may retrieve, from database 206, tasks whose parameter includes a particular product order number.

If a list of retrieved tasks is empty (block 504—NO), process 500 may terminate. For example, if no task is found as a result of performing block 502, the list of retrieved tasks may be empty, and process 500 may terminate. If the list of retrieved tasks is not empty (block 504—YES), a task among the list of retrieved tasks may be selected, and the selected task may be removed from the list (block 506).

For the selected task, it may be indicated, in the global action table, that an action for the selected task may include a follow up (block 508). For example, task management system 104 may create and insert, in the global action table (see block 404 in FIG. 4), a record that indicates an action for the selected task includes a follow up action.

A comment may be inserted in a global comment table (block 510). For example, task management system 104 may create and insert, in a global comment table, a record with a comment (e.g., a string of characters, such as "The task has been reassigned from John Doe to Jane Doe, because John Doe is on leave.").

The state information associated with the current task may be modified in accordance with the comment and the action (block 512). For example, an identifier for the comment inserted in the global comment table and an identifier for a follow up action (see block 508) may be incorporated as part of a record for the state information for the current task object. The record may be stored in database 206.

In another example, task management system 104 may modify and store other components of the state information. For instance, if the selected task itself is a follow up task, a portion of the state information for the current task may be written in database 206 as "verified." If the selected task is new, the state of the current task may depend on the parameters of the current task object.

Other global tables may be updated (block 516). For example, task management system 104 may update information related to the ticket object in a table stored in database 206.

If the list of retrieved tasks (see block 502) is now empty (block 518—YES), process 500 may terminate. Otherwise (block 518—NO), process 500 may return to block 506.

In addition to performing processes 300-500, task management system 104 may provide a user at browser application 106 with a number of services. For example, task management system 104 may provide the user, at browser application 106, a web page for accessing task management system 104.

Figure 6:
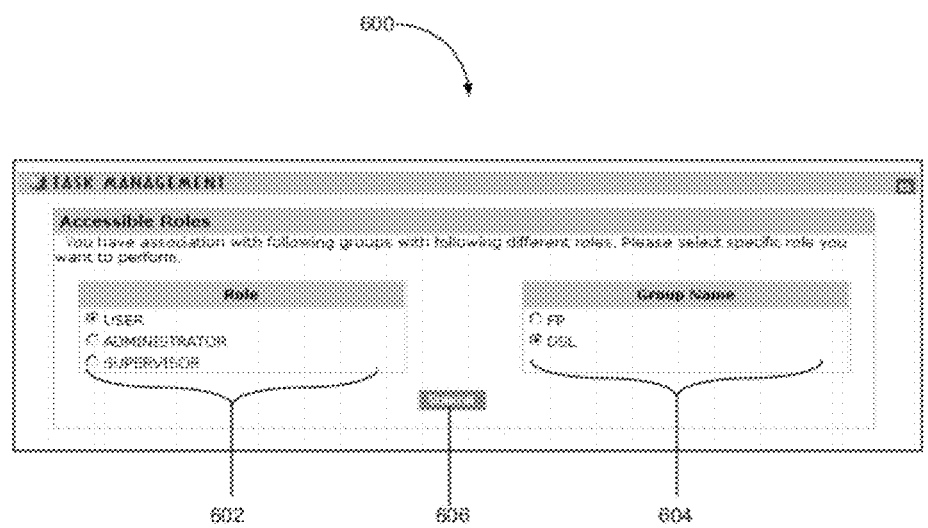
FIG. 6 is a diagram of an exemplary web page at a browser application of FIG. 1.

FIG. 6 is a diagram of an exemplary web page 600, at browser application 106, for accessing task management system 104. As shown, web page 600 may include a roles window 602, a group name window 604, and a submit button 606. Roles window 602 may allow a user to select a role (e.g., a set of access privileges) that the user may assume. Group name window 604 may allow a user to select a group to which the user belongs. Submit button 606 may include a mechanism by which the user at browser application 106 may send the selected role and the group to task management system 104.

Figure 7:
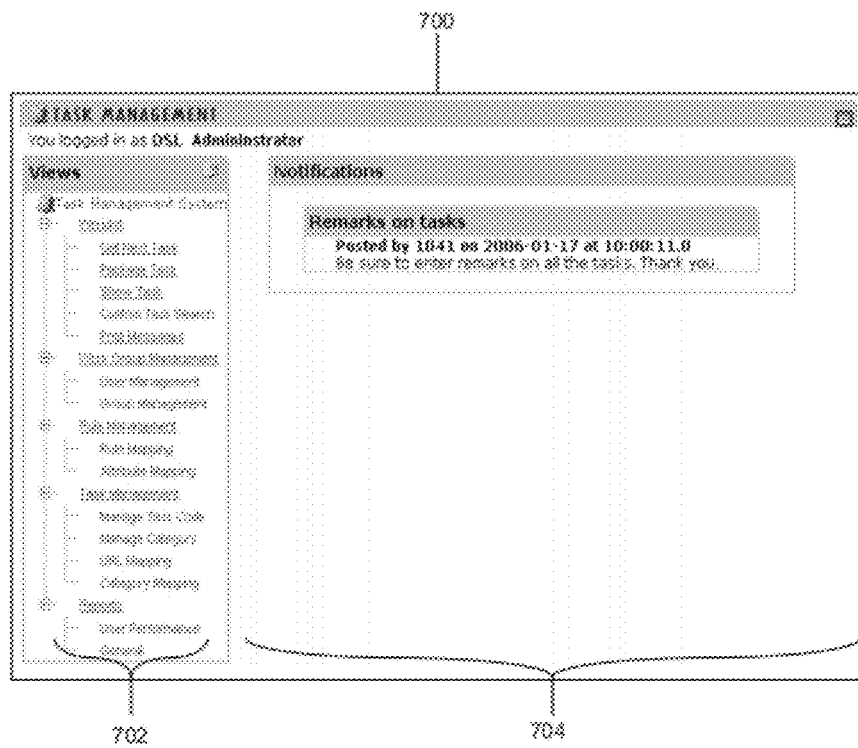
FIG. 7 is a diagram of another exemplary web page at the browser application.

FIG. 7 is a diagram of another exemplary web page. As shown, the web page may include a task management view 700 for managing and/or working with a task. As further shown, task management view 700 may include a task management tree 702 and a work space 704. Depending on the implementation, task management view 700 may include additional, fewer, or different components than those illustrated in FIG. 7.

Task management tree 702 may include a menu of all actions available for a role with (see FIG. 6) which the user accessed task management system 104. Work space 704 may include a window area in which the user may perform work (e.g., update a comment about a task, select tasks, etc.).

Figure 8:
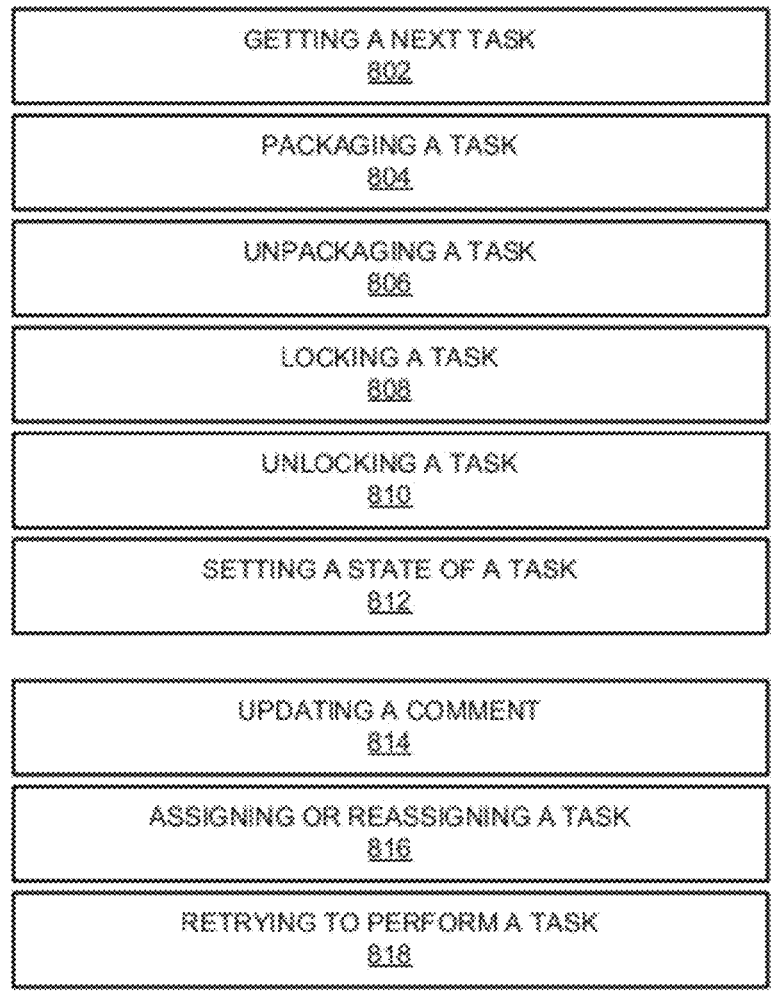
FIG. 8 shows a list of actions that a user may perform from the web page of FIG. 7.

FIG. 8 shows an exemplary list of actions that a user may perform at task management view 700. As shown, the list of actions may include getting a next task 802, packaging a task 804, unpackaging a task 806, locking a task 808, unlocking a task 810, completing setting a state of a task 812, updating a comment 814, assigning or reassigning a task 816, and retrying to perform a task 818. Depending on the implementation, the user may perform fewer, additional, or different types of actions at task management system 104 than those listed in FIG. 8. For example, in a different implementation, the user may search for a task or a set of tasks, rollback a task, or audit a task.

Getting a next task 802 may include displaying, via browser application 106, detailed information about a most recent task, for the user or for the user's group, in a pending state (e.g., ready to be worked on). Packaging a task 804 may include assigning a task to a user or group, or claiming or accepting a task that has been assigned to the user or to a group to which the user belongs. Unpackaging a task 806 may include unassigning a task that has been previously assigned, or un-claiming or returning a packaged task to the unclaimed state.

Locking a task 808 may prevent other users from modifying the locked task. For example, when a task is locked, other users may not provide comments to the task. Unlocking a task 810 may include reversing the effects of locking the task, to allow other users to modify the task. Setting a state of a task 812 may include changing a state of a task. For example, after the user completes a task, the user may change the state of the task to "completed," to indicate that the task has been completed. In another example, when the user is unable to complete the task, the user may change its state to "aborted," to indicate that the user has aborted the task. In yet another example, after the user verifies a task, the user may change the state to "verified."

Updating a comment 814 may include modifying or changing a comment that is associated with a task. Assigning or reassigning a task 816 may include assigning a task to a user or reassigning a task that is already assigned to one user to another user. Alternatively, assigning or reassigning a task 816 may include assigning a task to a queue (e.g., group queue 212, user queue 214, etc.). In some implementations, a user may need to have a supervisor or administrator privilege to assign or reassign a task. Retrying a task 818 may include returning a task to action queue 216 after automated agents 220 fail to perform the task.

In the above, provided that the user has an administrator or a supervisor privilege, the user may perform one or more actions 814-818 (e.g., updating a comment 814, assigning or reassigning a task 816, and/or retrying a task 818) in a bulk mode. In the bulk mode, the user may select a list of tasks and apply an action to the selected tasks once. For example, the user may select a list of ten tasks and apply reassigning a task 816 to the selected tasks. In such an instance, the user may avoid repeating the same action ten times.

Figure 9:
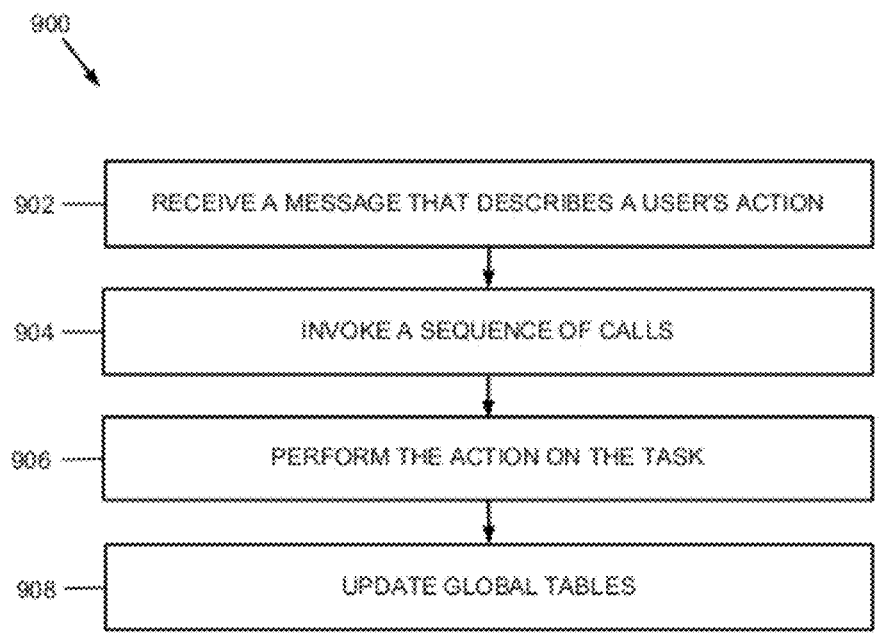
FIG. 9 is a flow diagram of an exemplary process for performing an action listed in FIG. 8.

FIG. 9 is a flow diagram of an exemplary process for performing, at task management system 104, an action listed in FIG. 8. As shown, process 900 may start by receiving a message that describes a user's action (block 902). For example, when the user clicks on a button in a web page on browser application 106 to package a task 804, browser application 106 may send a message that describes the user action. The message may include a remote procedure call, an XML message, a method invocation, etc. Subsequently, task management system 104 may receive the message.

A sequence of calls to application interfaces may be invoked (block 904). When task management system 104 receives the message, task management system 104 may invoke one or more functions/procedures/methods via application interfaces 224. For example, task management system 104 may invoke a method for packaging a task. The method, in turn, may invoke another method that determines whether the user can perform the action. In determining whether the user can perform the action, task management system 104 may check whether the user has a privilege (e.g., a supervisor or administrator privilege) to perform the action and/or whether a state change that results from the action is permitted (e.g., a task that is already locked by one user cannot be unlocked by another user, unless the user is a supervisor or an administrator).

The action may be performed on the task (block 906). For example, task management system 104 may invoke application interface 224 for unlocking the task.

Global tables may be updated in accordance with the action (block 908). For example, task management system 104 may receive comments from the user in connection with packaging a task, and may update the global comment table (block 510, FIG. 5) based on the received comments. In addition, task management system 104 may update the global state table (block 514) to indicate that the task is packaged.

Figure 10:
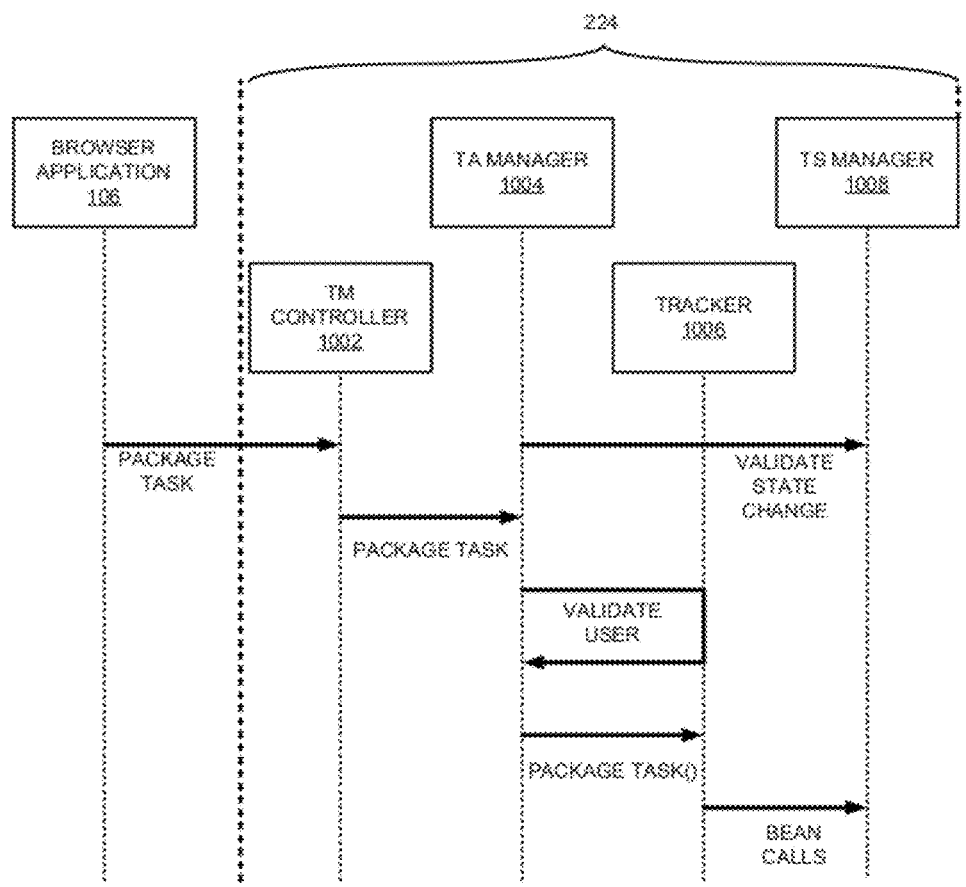
FIG. 10 illustrates a sequence of invocations to application interfaces for performing one of the actions of FIG. 8.

FIG. 10 shows an exemplary sequence of invocations to application interfaces 224 for performing one of the actions listed in FIG. 8. More specifically, FIG. 10 shows a sequence of invocations for packaging a task 806 (e.g., assigning a task to a user or a group). Other actions in FIG. 8 may be performed via similar sequences of invocations, although they are not illustrated. As shown, application interfaces 224 may include a task management (TM) controller 1002, a task action (TA) manager 1004, a tracker 1006, and a task state (TS) manager 1008. Depending on the implementation, application interfaces 224 may include additional, fewer, or different components than those illustrated in FIG. 10.

TM controller 1002 may include a component for receiving messages/remote calls from browser application 106 and for issuing corresponding calls to components within application interfaces 226. For example, upon receiving a call for packaging a task, TM controller 1002 may issue a call to task action manager 1004 for packaging the task.

TA manager 1004 may include a component for receiving a call from TM controller 1002, validating a state change that may result from packaging the task, validating the user, and requesting tracker 1006 to perform bookkeeping work. To validate the state change, TA manager 1004 may issue a call to another component, such as TS manager 1008. To validate the user, TA manager 1204 may request tracker 1006 to determine whether the user has a privilege to package the task. When the state change and the user are validated, TA manager 1004 may request tracker 1006 to perform bookkeeping work (e.g., updating the global comments table with a comment).

Tracker 1006 may include a component for responding to TA manager 1004's request to validate the user and to perform bookkeeping work. For example, tracker 1006 may determine that the user has the privilege to package a task. When tracker 1006 receives a request from TA manager 1004 to perform bookkeeping work, tracker 1006 may issue a series of calls to TS manager 1008 to perform the bookkeeping work.

TS manager 1008 may include a component for indicating, in response to a call from TA manager 1004, whether a state change is valid. In addition, when TA manager 1004 calls TS manager 1008 to perform bookkeeping work, TS manager 1008 may create other components (e.g., Java Beans) to perform various activities. Once created, the components may, for example, update database 206, the global comment table, the global action table, etc.

Figure 11:
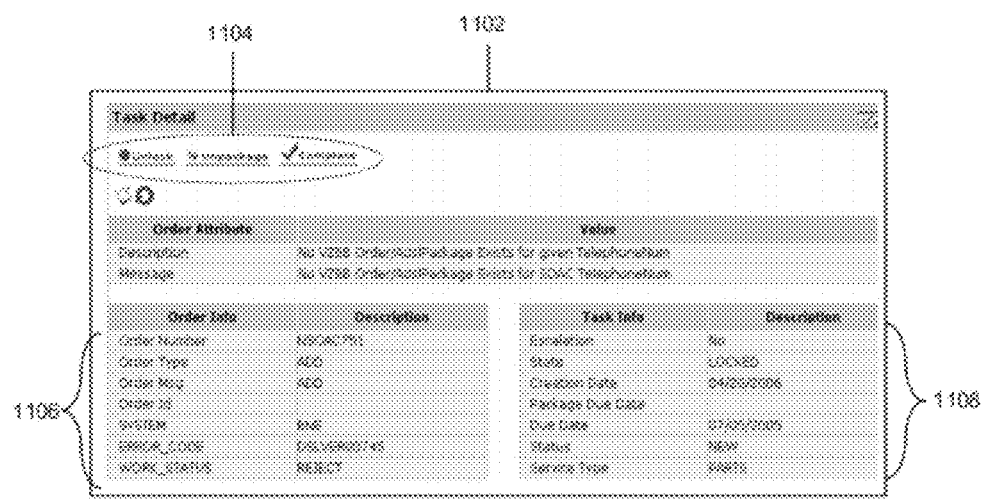
FIG. 11 illustrates a web page at the browser application of FIG. 1 when a user is performing an action listed in FIG. 8.

FIG. 11 illustrates a web page at browser application 106 when the user is performing an action listed in FIG. 8. As shown in FIG. 11, the web page display a detailed view 1102, which, in turn, may include an action list 1104, parameters 1106, and task information 1108. Depending on the implementation, detailed view 1102 may include additional or less information than that shown in FIG. 11.

Action list 1104 may include a list of actions that a user may perform for the task whose details are shown in detailed view 1102. Parameters 1106 may include names and values of parameters in the parameter value map (see the above description of block 308), such as order number, order type, etc. Task information 1108 may include information related to the task, such as its state information and/or other types of information (e.g., date of task creation, due date, etc.).

Figure 12:
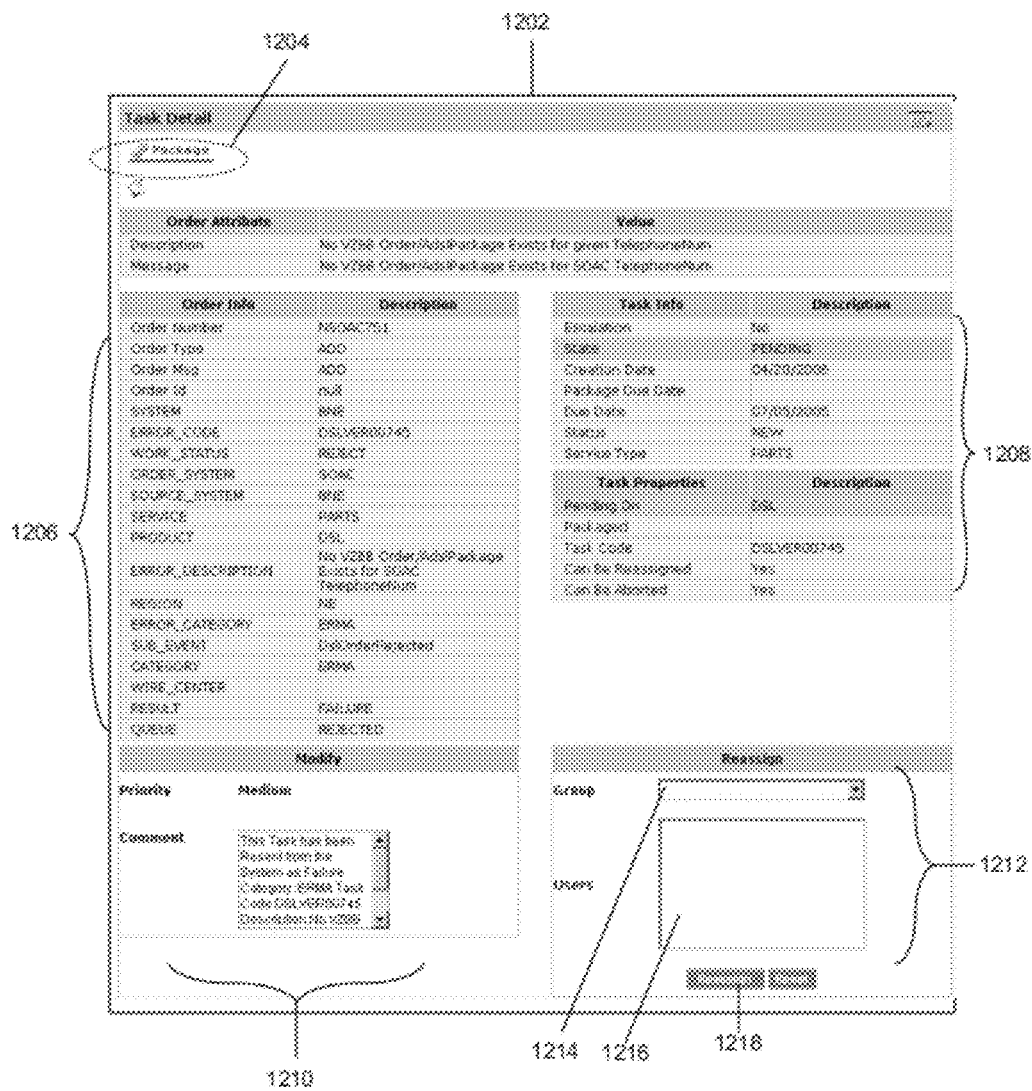
FIG. 12 shows a detailed view of a task at the browser application when the user is performing another action listed in FIG. 8.

FIG. 12 is a detailed view 1202 of a task at browser application 106 when the user is performing another action listed in FIG. 8. As shown in FIG. 12, detailed view 1202 may include an action list 1204, parameters 1206, task information 1208, comment box 1210, and reassign box 1212.

Action list 1204, parameters 1206, and task information 1208 may include similar types of components and information as action list 1102, parameters 1104, and task information 1108 (FIG. 11), and their description is omitted for purposes of simplicity. Comment box 1210 may show comments that have been created for the task.

Reassign box 1212 may include a group box 1214, a user box 1216, and a reassign button 1218. Group box 1214 and user box 1216 may include areas into which the user may type in names of the group and users to which the task is to be reassigned. Reassign button 1218 may permit the user to submit a request to reassign the task to task management system 104.

Figure 13:
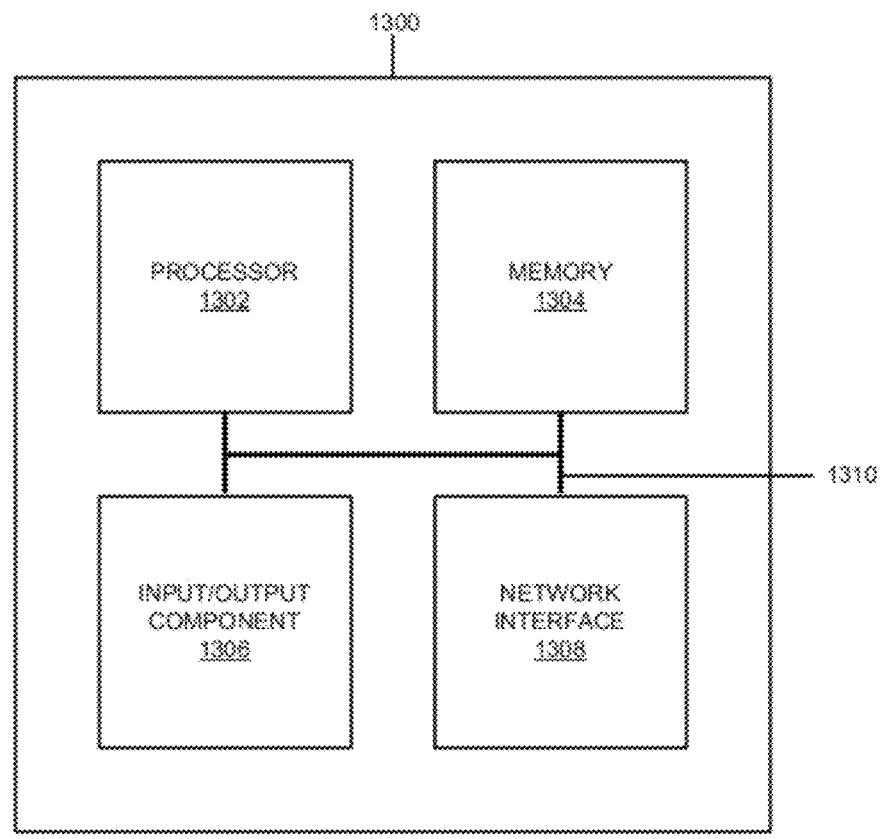
FIG. 13 is a block diagram of an exemplary device on which components of FIG. 1 and/or FIG. 2 may be implemented.

FIG. 13 is a block diagram of an exemplary device 1300 on which functional components of FIG. 1 and/or FIG. 2 may be implemented. Provisioning system 108 and/or task management system 104 may include one or more of device 1300. As shown, device 1300 may include processor 1302, memory 1304, input/output component 1306, network interface 1308, and communication path 1310. Depending on the implementation, device 1300 may include additional, fewer, different, or differently arranged components than those illustrated in FIG. 13.

Processor 1302 may include a processor, a microprocessor, an Application Specific Integrated Circuit (ASIC), a Field Programmable Gate Array (FPGA), and/or other processing logic capable of controlling network device 1300. Memory 1304 may include static memory, such as read only memory (ROM), and/or dynamic memory, such as random access memory (RAM), or onboard cache, for storing data and machine-readable instructions. Memory 1304 may also include storage devices, such as a floppy disk, CD ROM, CD read/write (R/W) disc, and/or flash memory, as well as other types of storage devices.

Input/output component 1306 may include a control button or switch, a light emitting diode (LED) or some form of display, a keyboard, a mouse, a speaker, a microphone, a Digital Video Disk (DVD) writer, a DVD reader, Universal Serial Bus (USB) lines, and/or another type of component for converting physical events or phenomena to and/or from digital signals that pertain to network device 1300.

Network interface 1308 may include any transceiver-like mechanism that enables network device 1300 to communicate with other devices and/or systems. For example, network interface 1308 may include mechanisms for communicating via a network, such as the Internet, a terrestrial wireless network (e.g., a WLAN), a satellite-based network, etc. Additionally or alternatively, network interface 308 may include a modem, an Ethernet interface to a LAN, and/or an interface/connection for connecting network device 300 to other devices (e.g., a Bluetooth interface).

Communication path 1310 may provide an interface through which components of device 1300 can communicate with one another.

The foregoing description of implementations provides an illustration, but is not intended to be exhaustive or to limit the implementations to the precise form disclosed. Modifications and variations are possible in light of the above teachings or may be acquired from practice of the teachings.

For example, while a series of blocks have been described with regard to the process illustrated in FIGS. 3-5 and 9, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    creating a new task object based on contents of a message related to a task, wherein the message is received via a network;
    obtaining, from the message, a parameter and an associated value related to the task;
    mapping the parameter to a parameter identifier of a plurality of parameter identifiers in a database;
    determining a routing rule, for routing the new task object, that corresponds to the parameter identifier;
    generating, based on the message, a task code to be written to the new task object;
    performing, when the task comprises a follow-up to an associated task, verification of a performance of the associated task;
    discarding the new task object when no other task corresponds to the follow-up;

assigning, when the task comprises a new task, the new task to a select queue for processing, based on the routing rule;
creating, based on new task object, a ticket object for tracking the new task;
storing, in a global action table, information associated with an action related to the ticket object; and
storing, in a global state table, state information indicative a state of the new task object.

2. The method of claim 1, further comprising:
determining whether the contents of the message contain the task code.

3. The method of claim 2, wherein generating a task code comprises:
obtaining, based on a determination that the contents of the message contain the task code, the task code from the message.

4. The method of claim 2, wherein generating a task code comprises:
creating, based on a determination that the contents of the message do not contain the task code, the task code based on contents of the message.

5. The method of claim 1, wherein determining a routing rule comprises:
looking up, in a database of routing rules, the routing rule corresponding to the parameter identifier to identify a group or a user to which to route the task.

6. The method of claim 1, wherein determining a routing rule comprises:
determining that no routing rule in a database corresponds to the parameter identifier; and
assigning a default group or a default user to which to route the task.

7. The method of claim 1, wherein the state of ticket object comprises at least one of:
a pending state, an aborted state, a completed state, a locked state, or a packaged state.

8. The method of claim 1, further comprising:
storing, in a global comment table, a user-created comment comprising a note related to the task or the ticket object.

9. The method of claim 1, further comprising:
storing, in a global comment table, a system-created comment comprising a record of a user action taken with respect to the task or the ticket object.

10. The method of claim 1, further comprising:
attempting to perform an action associated with the new task object;
detecting a failure of the attempt to perform the action; and
placing the new task object in a retry queue based on the detected failure.

11. The method of claim 10, wherein attempting to perform the action includes at least one of:
obtaining a next task, packaging the task, unpackaging the task, locking the task, unlocking the task, setting a state of the task, updating a comment, assigning or reassigning the task, retrying to perform the task, rolling back the task, searching for related tasks, or auditing the task.

12. The method of claim 10, wherein attempting to perform the action includes:
receiving a message that describes the action from a browser application;
invoking a sequence of calls to application interfaces to perform the action; and
updating at least one of the global action table or the global state table to reflect changes resulting from invoking the sequence of calls.

13. A device comprising:
a memory comprising a database; and
one or more processors to:
create a new task object based on contents of a message indicative of a task, received via a network,
obtain, from the message, a parameter and an associated value related to the task,
map the parameter to a parameter identifier, of a plurality of parameter identifiers in the database, associated with the new task object,
determine a routing rule, for routing the new task object, that corresponds to the parameter identifier,
generate, based on the message, a task code to be written to the new task object,
determine whether the task comprises a new task or a follow-up to an associated task,
when the task comprises a follow-up to an associated task,
retrieve a task object having an associated parameter identifier that corresponds to the parameter identifier associated with the new task object,
change a state of the retrieved task, and
update state information, stored in a global state table, indicative of the state change, and
when no other task corresponds to the follow-up:
discard the new task object.

14. The device of claim 13, wherein the contents of the message comprise at least one of:
an order number, a task code, or an order type.

15. The device of claim 13, wherein when the task comprises a new task, the one or more processors are further configured to:
create, based on the new task object, a ticket object for tracking the new task;
store, in a global action table, information associated with an action related to the ticket object; and
store, in the global state table, state information indicative a state of the new task object.

16. The device of claim 15, wherein the one or more processors are further configured to:
store, in a global comment table, a user-created comment comprising a note related to the new task or the ticket object.

17. The device of claim 15, wherein the one or more processors are further configured to:
store, in a global comment table, a system-created comment comprising a record of a user action taken with respect to the new task or the ticket object.

18. The device of claim 13, wherein the one or more processors are further configured to:
receive a second message from a user at a remote browser application over the network, the second message containing a user role identifying actions the user is to perform with respect to the task.

19. The device of claim 13, wherein the state of the retrieved task comprises one of:
a pending state, an aborted state, a completed state, a locked state, or a packaged state.

20. A non-transitory computer-readable storage medium, comprising computer-executable instructions for causing one or more processors executing the computer-executable instructions to:
create a new task object based on contents of a message related to a task, wherein the message is received via a network;
obtain, from the message, a parameter and an associated value associated with the task;

map the parameter to a parameter identifier of a plurality of parameter identifiers in a database;

determine a routing rule, for routing the new task object, that corresponds to the parameter identifier;

generate, based on the message, a task code to be written to the new task object;

perform, when the task comprises a follow-up to an associated task, verification of a performance of the associated task;

discard the new task object when no other task corresponds to the follow-up;

assign, when the task comprises a new task, the new task to a select queue for processing, based on the routing rule;

create, based on new task object, a ticket object for tracking the new task;

store, in a global action table, information associated with an action related to the ticket object; and store, in a global state table, state information indicative a state of the new task object.

* * * * *